Figure 14:
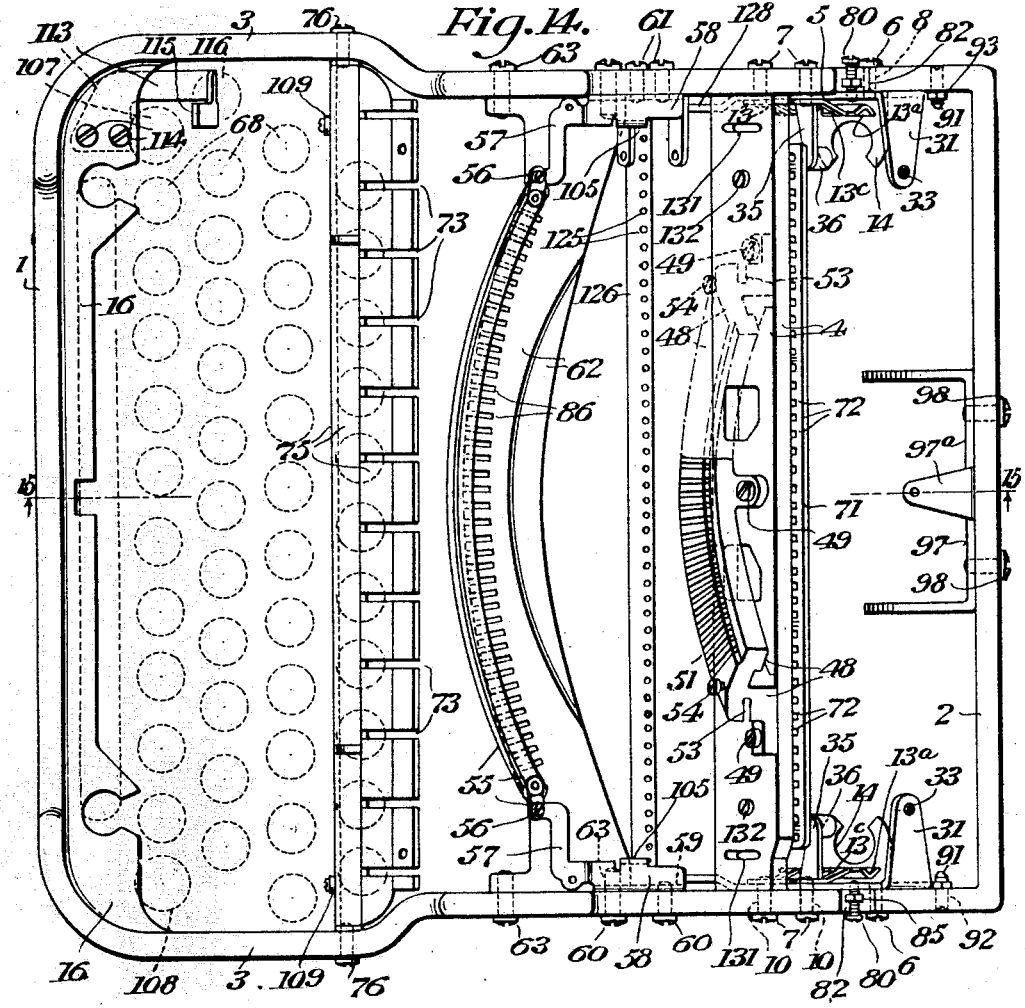

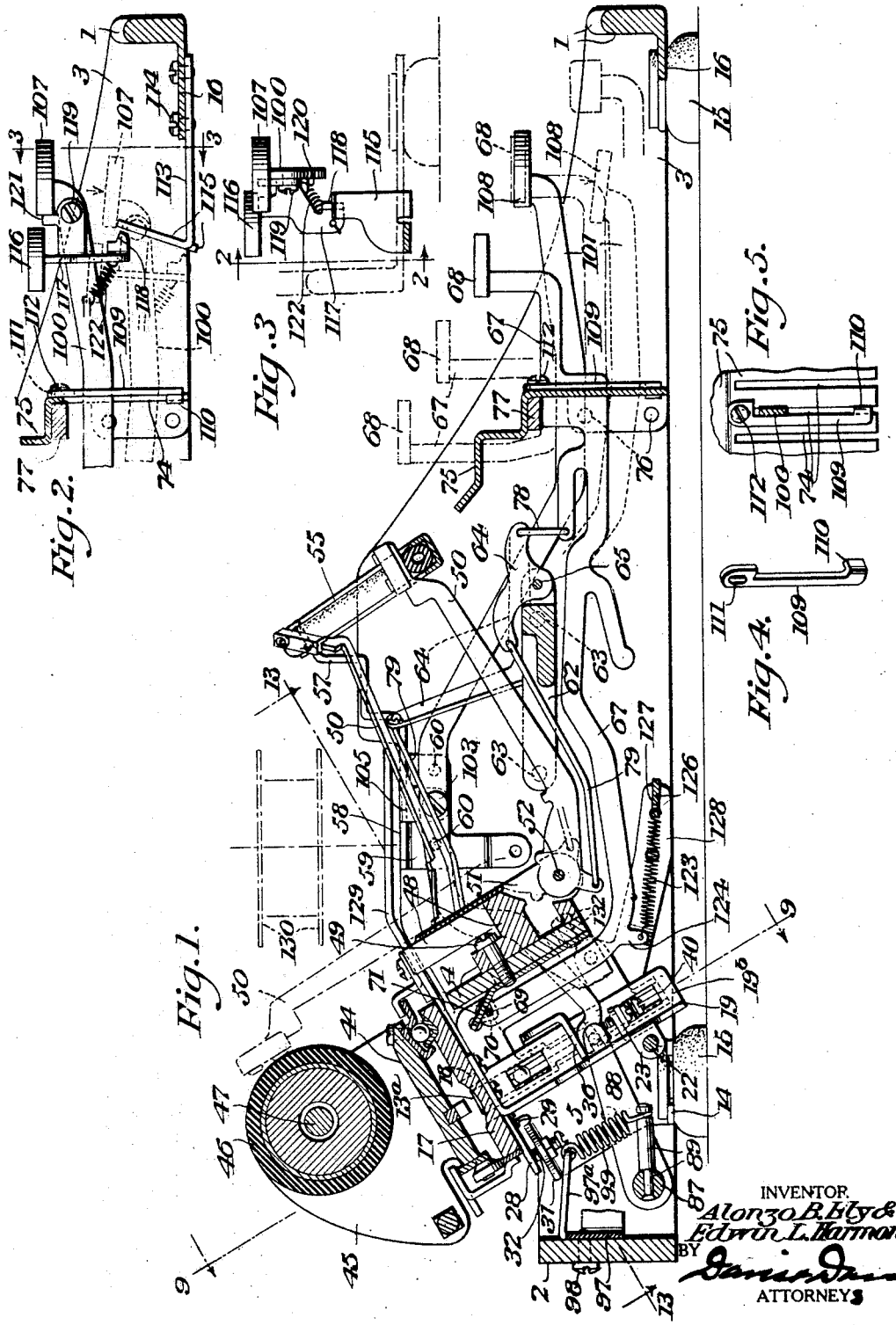

Dec. 25, 1928.  1,696,227
A. B. ELY ET AL
TYPEWRITING MACHINE
Filed May 9, 1925   4 Sheets-Sheet 2
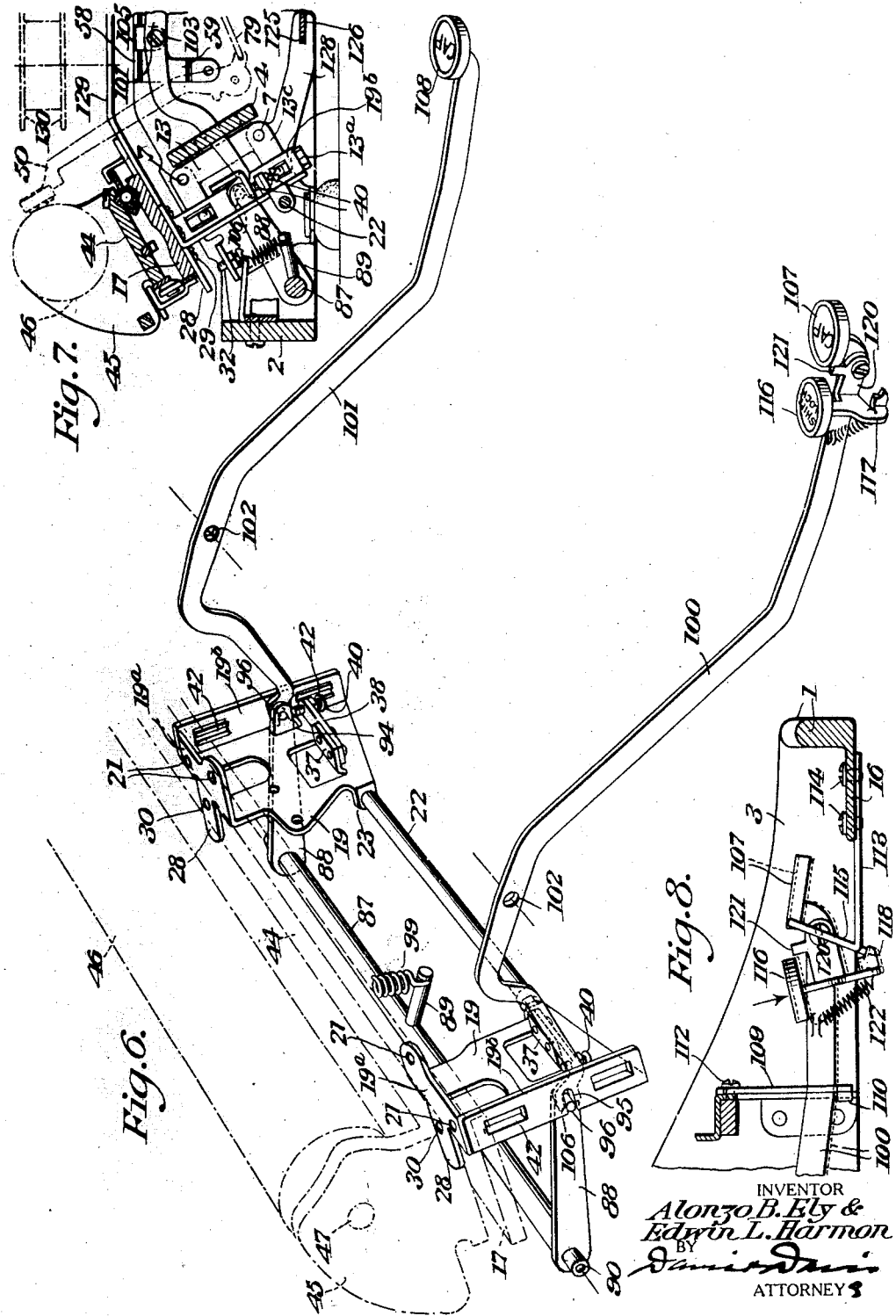

Dec. 25, 1928.  1,696,227
A. B. ELY ET AL
TYPEWRITING MACHINE
Filed May 9, 1925     4 Sheets-Sheet 3
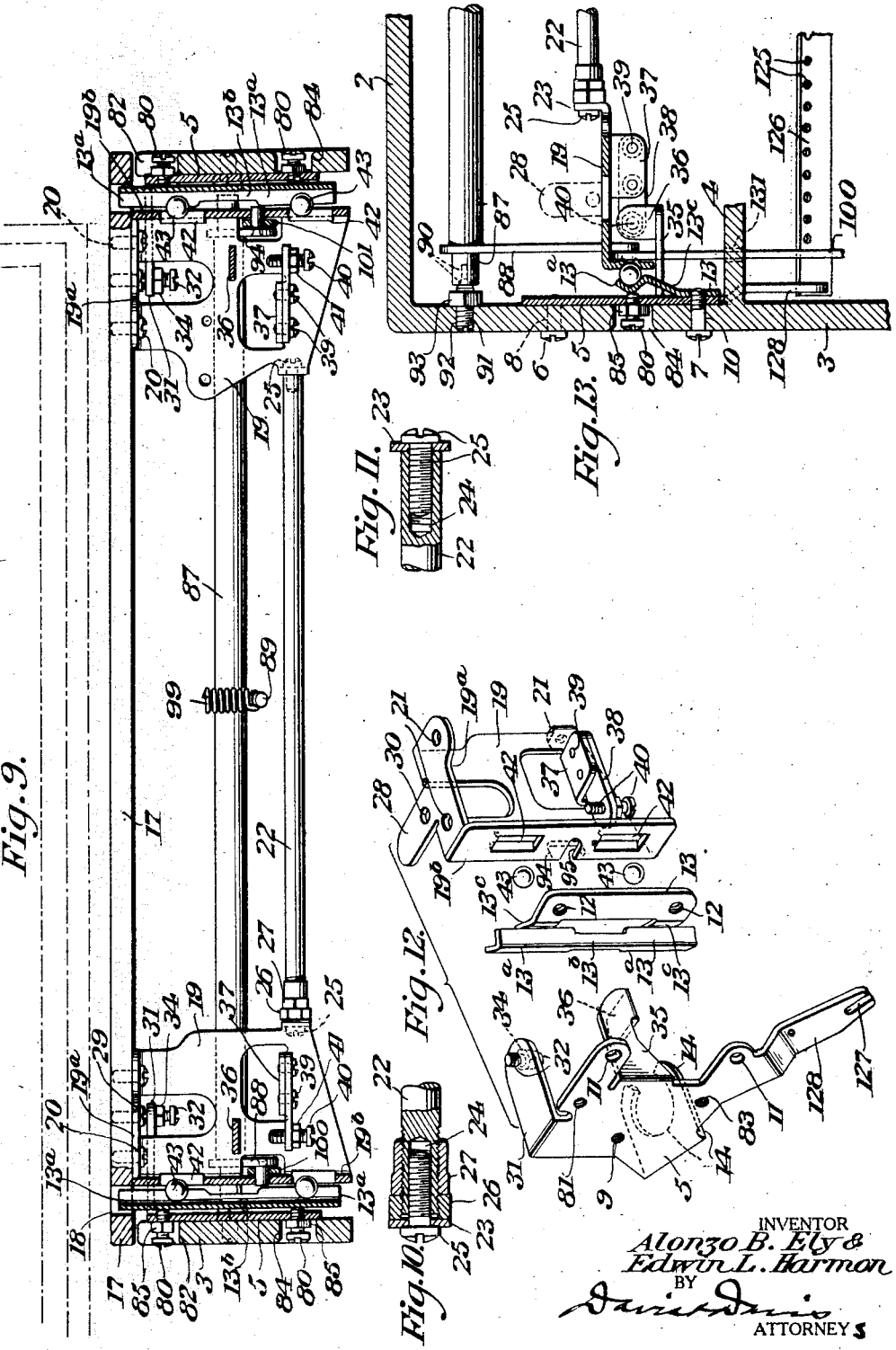
INVENTOR
*Alonzo B. Ely &*
*Edwin L. Harmon*
BY
ATTORNEYS Dec. 25, 1928.

A. B. ELY ET AL 1,696,227

TYPEWRITING MACHINE

Filed May 9, 1925 4 Sheets-Sheet 4

INVENTOR
Alonzo B. Ely &
Edwin L. Harmon
BY
ATTORNEY

Patented Dec. 25, 1928.

1,696,227

UNITED STATES PATENT OFFICE.

ALONZO B. ELY AND EDWIN L. HARMON, OF GROTON, NEW YORK, ASSIGNORS, BY MESNE ASSIGNMENTS, TO L C SMITH & CORONA TYPEWRITERS INC., OF SYRACUSE, NEW YORK, A CORPORATION OF NEW YORK.

TYPEWRITING MACHINE.

Application filed May 9, 1925. Serial No. 29,125.

This invention relates to improvements in typewriting machines, and more particularly to the case changing means thereof.

The invention has for its principal objects to provide simple and efficient antifriction guiding means for a case changing support; to provide a case shift mechanism of simple, light, compact and inexpensive construction especially suitable for portable typewriting machines; to provide key-operated means for actuating a shiftable platen carriage support which is easy to operate; to provide key-operated means especially adapted for supporting and shifting a platen carriage in a low flat portable typewriting machine of the three-quarter strike class; to provide an improved means for preventing injury to the shift mechanism when excessive pressure is exerted on a shift key; to provide simple and efficient key-operated shifting and locking means for a case changing support; to provide a simple and efficient arrangement of guiding and stopping means for a case changing support; to provide a rigid and light shift frame for a platen carriage of simple and inexpensive construction; and to provide an improved construction and arrangement of shift frame, counterbalance and torsion frame, and shift key levers.

Other objects and advantages of the invention will appear from the following description in detail of the preferred embodiment of the invention illustrated in the accompanying drawings, in which Fig. 1 is a vertical sectional view of a low and flat portable typewriting machine of the three-quarter strike class provided with the improved case shift mechanism, the section being taken on a line extending fore-and-aft through the center of the machine and the parts being in normal lower case position;

Fig. 2 a section on the line 2—2 of Fig. 3 showing the shift locking means, the parts being in normal position;

Fig. 3 a section on the line 3—3 of Fig. 2;

Figs. 4 and 5 perspective and front views, respectively, of one of the depression limiting stops for the shift key levers;

Fig. 6 a perspective view showing parts of the case shift mechanism.

Fig. 7 a fragmentary section similar to Fig. 1 with the parts in upper case position;

Fig. 8 a view similar to Fig. 2 showing the parts in shift-locking position;

Fig. 9 a transverse section on the line 9—9 of Fig. 1;

Figs. 10 and 11 detail views showing the left and right hand connections, respectively, between the upright members of the shift frame and the connecting tie or brace member;

Fig. 12 a perspective view showing the stop bracket and antifriction guiding and supporting means for the left hand end of the carriage bed detached;

Fig. 13 a fragmentary section on the line 13—13 of Fig. 1;

Fig. 14 a plan view of the main frame and parts held thereto; and

Figure 15:
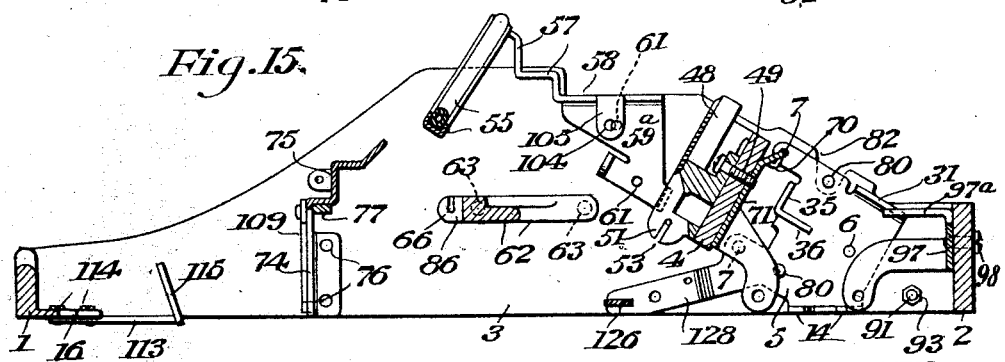

Fig. 15 a section on the line 15—15 of Fig. 14, the left hand adjustable raceway member being removed.

Only so much of the machine has been shown and will be described as is necessary to a full understanding of the invention claimed herein. The main frame comprises a one-piece metal casting having vertical side and end walls and an inclined intermediate transverse wall connected with the side walls near the rear end of the frame. The front wall 1 is lower than the level of the front bank of keys of the keyboard, the rear wall 2 is approximately as high as said bank of keys, and the middle portions of the side walls 3 are approximately as high as the rear bank of keys and are of reduced height both fore-and-aft of said middle portions, merging at their ends with the front and rear walls. The keys of the keyboard are arranged in the forward part of the main frame in the usual manner to form a standard four-bank keyboard. The intermediate wall 4 is flat and relatively wide and is disposed edgewise in a transverse plane inclined rearwardly at an angle of 30 degrees from the vertical, said wall extending between the rear reduced portions of the side walls 3 with its upper edge approximately level with the second highest bank of keys and its lower edge above the level of the bottom edges of the side and end walls.

A pair of stiff sheet metal brackets 5 have their flat body portions clamped tightly against the inner faces of the frame walls 3 between walls 2 and 4 by means of clamping screws 6 and 7. A screw 6 is passed inwardly through an aperture 8 in each wall of the main frame and screwed through a threaded aperture 9 in one of the brackets 5 until the screw heads abut the outer face of the frame wall and bracket 5 is tightly clamped against the inner face of the wall. Two screws 7 are passed through apertures 10 in each wall 3 one above the other in a plane parallel with inclined wall 4 and in the rear of said inclined wall and through registering apertures 11 in the adjacent bracket 5 and screwed through threaded apertures 12 in a sheet metal shift-frame-guide member 13 to tightly clamp said member to the inner face of the bracket and clamp both the bracket and guide member to the adjacent side wall of the frame. Each bracket 5 is provided with an integral inwardly extending arm 14 at its lower edge flush with the lower edge of the adjacent frame wall and provided with a keyhole slot in which is secured the upper end of a rubber cushion foot 15, and the front wall 1 is provided with an integral rearwardly extending flange 16 flush with its lower edge provided with key-hole slots near its ends in which a similar pair of cushion feet 15 are secured at their upper ends near opposite sides of the main frame, the four feet 15 supporting the main frame in a slightly elevated position.

Each guide member 13 is formed of a single piece of relatively thin resilient sheet steel stamped and pressed to form a long and narrow flat attachment portion near the upper and lower ends of which the threaded apertures 12 are formed, lying against the inner face of the adjacent bracket 5, and a rigid raceway portion parallel with the flat portion and offset inwardly entirely beyond the fore-and-aft plane of the attachment portion and of channel form in cross section. The raceway and attachment portions are inclined rearwardly parallel with the plane of wall 4 and the channel in the raceway portion faces inwardly. The diverging side walls of the channel portion are partly cut away along their inner edges midway their ends as shown, forming in effect two rigid raceways $13^a$ of V-cross section connected by an integral rigid tie portion $13^b$ of similar cross section but somewhat narrower than the raceways. The forward wall of each raceway $13^a$ is connected midway its upper and lower ends with the adjacent end of the attachment portion of the guide member by an integral resilient arm $13^c$, the two arms normally extending downward and inward from the attachment portion to the race way wall and supporting the channel portion out of contact with bracket 5, as shown in Fig. 14, and being flexible either inwardly or outwardly and temporarily twistable slightly laterally in either direction without permanent distortion or bending. The rigid channel portion of the guide member may thus be shifted bodily transversely of the machine either inwardly or outwardly, and may also be tilted or canted either inwardly or outwardly, its channel form so stiffening the same that it will withstand lateral and fore-and-aft shocks, or pressure on the raceways $13^a$, without bending or flexing so that the two raceways will always remain in alignment.

A shiftable platen carriage support or case-shift frame is supported and guided by the members 13 on ball bearings to move up and down at the rear part of the main frame in a transverse rearwardly inclined plane parallel with the plane of wall 4, said frame being located between the vertical transverse plane of the rear wall 2 and the inclined transverse plane of the front face of wall 4 and entirely below the level of the highest part of the main frame and the highest bank of keys to support the carriage over the extreme rear low part of the main frame at a low point back of the plane of the pivots of the system of type bars, as hereinafter described.

The shift frame comprises a flat oblong cast metal carriage bed 17 extending transversely of the machine and normally closely overlying the upper edges of the rear portions of the side walls 3 of the main frame, said bed and the underlying parts of the upper edges of the side walls lying in planes inclined downwardly and rearwardly and perpendicular to the plane of wall 4, the upper edge of wall 4 terminating close to the inclined upper edges of walls 3, and the bed being located wholly in the rear of the plane of the front face of wall 4 with the front edge of the bed overhanging the upper edge of wall 4 and the rear edge of the bed forward of the plane of wall 2. The front edges of the attachment portions of guides 13 lie close to the rear face of wall 4, and the upper ends of the upper raceways $13^a$ on the guides normally project through apertures 18 in the carriage bed near opposite ends of the bed, with the upper flexible arm of each guide member lying close to the under face of the bed, whereby the bed is normally positioned at the lowest possible point in very compact relation with the main frame and the guides 13.

A pair of brackets or guide members 19 formed of stiff sheet metal depend from the bed 17 near opposite ends of the bed with their flat body portions disposed in a transverse inclined plane parallel with the plane of wall 4 and perpendicular to the plane of the bed. Each member 19 is formed along its upper edge with an integral forwardly and upwardly extending attachment flange $19^a$ abutting flat against the under face of the bed and detachably held thereto by two screws 20 passed upwardly through apertures 21 in the flange and threaded into the bed. Along its outer edge, each member 19 is formed with an integral raceway flange $19^b$ projecting upwardly and forwardly from the body portion of the member perpendicular thereto and extending along and close to the inner face of the channel portion of the adjacent member 13. The outer edge of the attachment flange 19ª abuts the inner face of flange 19ᵇ at the upper end of said flange and is brazed thereto, thus assisting the inherent stiffness of the metal in maintaining the parts of member 19 in fixed relation.

The members 19 are connected near their lower ends by a rigid tie or brace means which is expansible and contractible transversely of the machine and comprises a rigid metal rod 22 extending between integral lugs 23 extending rearwardly from the inner edges of members 18 and lying edgewise in vertical planes extending fore-and-aft of the machine. The rod 22 is provided with internally threaded axial bores or sockets 24 at its ends of substantial length partly into which are screwed screws 25 passed inwardly through apertures in lugs 23. The rod is externally threaded at its left hand end and a telescoping internally threaded sleeve 26 is screwed on said externally threaded end of the rod and is adapted to be adjusted to project beyond the end of the rod different distances and locked in adjusted position by a lock nut 27 also threaded on the left hand end of the rod at the inner end of the sleeve. The sleeve 26 is of polygonal external contour so that both the sleeve and nut may be adjusted with a wrench. By tightening the right hand screw so that the lug 23 on the right hand bracket is clamped between the screw head and the right hand end of rod 22, and then properly adjusting the sleeve and left hand screw to clamp the lug 23 on the left hand bracket, the two brackets may be rigidly held in exact parallelism against inward or outward spreading at their lower ends.

A lower case stop lug 28 is stamped rearwardly out of the body portion of each bracket 19 into the plane of the flange 19ª, said lug abutting flat against the under face of the carriage bed and projecting beyond the rear edge of the bed, the projecting end of the lug forming a stop abutment. A fastening screw 29 is passed up through an aperture 30 in the forward part of each lug 28 and screwed into the bed. The flange 19ª and lug 28 thus form broad flat attachment means abutting the bed both fore-and-aft of the plane of the body portions of the brackets 19 and secured to the bed by staggered screws so that the brackets are securely held in fixed relation to the bed in a manner to resist tilting in any direction.

Each bracket 5 on the main frame is formed with an integral arm 31 extending inwardly from its upper edge back of the adjacent guide members 13 and 19 below the adjacent stop lug 28 and in a plane parallel with the plane of lug 28. The projecting ends of lugs 28 normally rest on top of adjustable lower case stop screws 32 threaded upwardly through screw threaded apertures 33 in arms 31, said screws extending perpendicular to the plane of the arms and being arranged for adjustment from the bottom of the machine by means of a screw driver and locked in adjusted position by lock nuts 34 thereon arranged to engage the lower faces of arms 31. Each bracket 5 is formed with an integral arm 35 extending inward from its forward edge in a plane parallel with the path of shift of the shift frame through the opening in the adjacent guide member 13, past the front edge of the raceway flange on the adjacent guide member 19, and provided at its inner end with an integral upper case stop lug 36 extending rearwardly from its lower edge in a plane perpendicular to said arm and the plane of shift of the shift frame to a point close to the front face of member 19. Each member 19 is provided with a stop carrying lug 37 stamped from its body portion and extending forwardly in a plane perpendicular to the planes of said body portion and the plane of shift thereof. Sheet metal stop carrying plates 38 are rigidly but detachably held at their inner ends flat against the under faces of lugs 37 by pairs of screws 39 passed upward therethrough and threaded into the lugs, the outer ends of said plates extending under stop lugs 36 and carrying adjustable upper case stop screws 40 screwed upwardly through threaded apertures in the outer ends of the plates and adapted to be adjusted by a screw driver from the bottom of the machine and locked in adjusted position by lock nuts 41 arranged to engage the lower faces of the plates. Stop screws 40 are adapted to engage the under faces of stop lugs 36 to positively arrest upward movement of the shift frame, as shown in Fig. 7, to determine the upper case position of the shift frame. The detachable stop carrying plates facilitate assembly of the case shift mechanism. Lugs 28, 36 and 37, arms 31 and 35, and plates 38 are formed of stiff sheet metal so that the shift frame will be positively arrested in its two case positions, but by forming these parts of sheet metal as described the noise of impact of the upper and lower case stops is materially deadened.

Each raceway flange 19ª on members 19 is provided with two aligned, relatively short, longitudinally extending ball race slots 42 parallel with the plane of wall 4 and arranged opposite the raceways 13ª on the members 13. The metal along the longitudinal edges of the slots 42 is pushed in slightly beyond the inner faces of flanges 19ª and these side walls or edges of the slots are oppositely beveled, as shown more clearly in Figs. 12 and 13, by grinding operations. An antifriction rolling element in the form of a steel ball 43 of greater diameter than the width of the slot travels along each slot 42 and each raceway 13ª, the four balls being confined between the channel portions of members 13 and flanges 19ª and serving in combination with the same to support and guide the shift frame to move in a plane inclined rearward at an angle of thirty degrees from the vertical and to resist fore-and-aft and lateral movement of the shift frame. The ends of the slots prevent the balls moving out of the ends of the races.

A platen carriage, comprising a flat base plate 44 and end plates 45, is supported and guided on the carriage bed 17 by suitable antifriction devices, as shown, to travel transversely of the machine with the base plate 44 in an inclined plane parallel with the plane of the bed and with the end plates extending upward and rearward from the base plate in vertical fore-and-aft planes. A platen roller 46 has its shaft 47 journalled in the upper front parts of the end plates 45, the upper front portion of the roller projecting slightly forward of the plane of wall 4 of the main frame. A type bar segment 48 is securely by screws 49 to the central portion of the front face of the inclined wall 4 at an angle of thirty degrees from the vertical, the ends of the segment terminating below the plane of the carriage base plate, and the lowest portion of the segment being substantially level with the lower edge of wall 4. The heels of an arcuate system of normally forwardly and upward extending type bars 50 are pivotally held in guide slots 51 in the segment converging as usual toward a point below the printing point, said bar heels being pivoted on an arcuate fulcrum wire 52 held in a groove 53 in the segment by screws 54, said wire lying in a plane inclined rearward at an angle of thirty degrees from the vertical.

An arcuate type rest 55, disposed in a rearwardly inclined plane above and forward of the segment and in the rear of the keyboard, supports the heads of the type bars with the heads of the central bars approximately level with the highest bank of keys. The rest is secured at its ends by screws 56 to the forward ends of arms 57 extending upward and forward and inward from the forward ends of the horizontal inwardly extending flanges 58 at the upper edges of sheet metal brackets 59 and 59ª. The brackets 59 and 59ª are held by pairs of screws 60 and 61, respectively, to the inner faces of the right and left hand side walls 3 of the main frame with flanges 58 in a horizontal plane substantially level with the highest bank of keys and above and forward of frame wall 4.

An arcuate sub-lever segment 62 is held to the side walls of the main frame by pairs of screws 63 with said segment curving rearwardly in a horizontal plane slightly above the level of the lower edge of wall 4 and underlying the system of type bars 50. An inwardly converging system of bell-crank levers 64 are fulcrummed on an arcuate pivot wire 65 confined in a groove 66 curving around the segment 62 across the rearwardly converging sub-lever guide slots 86 in the forward edge of said segments, so said levers swing up and down in rearwardly converging vertical planes. A system of parallel key levers 67 support printing keys 68 in four banks at the forward ends and extend rearward under segment 62 and wall 4 and then upward and rearward behind said wall, said levers being fulcrumed at their rear ends on a transverse pivot wire 69 supported in a plurality of eyes 70 stamped rearwardly from the upper part of a sheet metal plate 71 along the upper edge of the plate close to the upper edge of wall 4, to the rear face of which wall the plate is secured by fastening screws 132 and the central segment-fastening screw 49. The key levers are guided at their rear ends by slots 72 in the rearwardly and downwardly bent upper portion of plate 71, and are guided near their forward ends in slots 73 and 74 in the rearwardly extending and vertical walls, respectively, of a sheet metal guide comb 75 which is secured at its flanged ends to the side walls 3 of the main frame by screws 76 and supports a printing key-lever stop cushion 77. The key levers 67 are connected by vertical links 78 to the forward arms of the bell cranks 64, and the type bars are connected by links 79 with the rear arms of the bell cranks. Each type bar head carries upper and lower case types arranged in a single plane, and the type heads of the system of bars are deflected laterally progressively from the center to the sides of the system in the usual manner so that when a type bar is swung to printing position both types will lie in the vertical fore-and-aft central plane of the machine at different levels, the bars and segment and platen in the machine shown being so arranged that the upper and lower case types in the printing position of a bar lie in a plane inclined rearward at an angle of thirty degrees from the vertical parallel with the plane of shift of the platen 46, with the printing line along the upper front quarter of the platen at a level to normally receive the impact of the lower case type which are arranged farthest from the free ends of the type bars.

It will be obvious that by proper relative adjustment of the upper and lower case stop screws the platen may be so positioned and its extent of shift so adjusted that both the upper and lower case type will print squarely on the same printing line. The adjustable guide members 13 are laterally flexible and tiltable both inward and outward to compensate for variations in width of the shift frame and to afford direct lateral and lateral tilting adjustments of the shift frame to insure shifting of the frame perpendicularly to the platen axis and permit endwise adjustment of the platen carriage and shift frame to align the printing point with the vertical fore-and-aft plane of the types on a bar when the bar is in printing position. For so adjusting the members 13 a pair of independently adjustable screws 80 are provided for each member, said screws cooperating with the shift frame raceway flanges and the balls 43 between said flanges and members 13 to hold the members in adjusted position with the desired pressure on the antifriction balls. The upper screw 80 of each pair of adjusting screws for each member 13 is screwed inward through a threaded aperture 81 in the adjacent bracket 5 and its inner end abuts the center of the outer face of the upper raceway $13^a$, the head of said screw being accessible through a notch 82 in the side wall of the main frame. The lower screw 80 of each pair is threaded inward through a screw threaded aperture 83 in the bracket 5 so positioned that the inner end of the screw abuts the center of the outer face of the lower raceway $13^a$, the head of the screw being accessible through an aperture 84 in the side wall of the main frame. The several screws 80 are locked in adjusted position by lock nuts 85 thereon screwed up against the outer faces of brackets 5 in said notches 82 and apertures 84, respectively.

A combined shift torsion and shift-frame-counter-balancing frame is mounted in the rear lower part of the main frame behind the shift frame and comprises a rock shaft 87, a pair of rock arms 88 near the ends of said shaft, and a third rock arm 89 at the middle of the shaft. Rock shaft 87 comprises a metal rod having reduced end portions provided with axial conical sockets 90 in which engage the conical inner ends of adjustable bearing screws 91. Screws 91 are adjustable transversely of the machine and are screwed inward through threaded apertures 92 in the side walls 3 of the main frame close to the lower edges of said walls and close to the rear frame wall 2. Screws 91 are locked in adjusted position by lock nuts 93 thereon screwed against the inner faces of walls 3. Arms 88 are formed of sheet metal and are mounted at their rear ends on the reduced ends of shaft 87 with the inner faces thereof abutting the shoulders at the ends of the main body of the shaft, said arms being fixedly secured to the shaft by brazing. The arms 88 extend upwardly and forwardly, passing through openings 94 in brackets 19 and terminate opposite and spaced from the inner faces of raceway flanges $19^b$, so as to permit relative lateral adjustments of the shift frame and torsion frame, the openings 94 being of sufficient size to permit free swinging of the arms and relative lateral movement between the arms and brackets 19. Arms 88 terminate back of the plane of arms 35 on brackets 5 and swing in planes spaced outwardly beyond the vertical planes of the outer edges of stop lugs 36 on said arms 35 to permit arms 88 to swing upward and allow lateral adjustment of the torsion frame. The raceway flanges $19^b$ are provided with slots 95 extending upward and forward from their rear edges perpendicular to the path of shift of said flanges, and horizontal metal pins 96 rigidly affixed to the rock arms 88 extend outwardly from the forward ends of the rock arms through said slots, these pins being of sufficient length to permit lateral adjustments of the shift and torsion frames. The parts are so arranged that when the torsion frame is rocked upward and rearward with the shift frame in lower case position the pins will move from points somewhat below a plane perpendicular to the path of shift passing through the axis of the rock shaft to points in or slightly above said plane so that the pins will exert lifting thrust on the shift frame substantially in the direction of movement of the shift frame. Rock arm 89 comprises a metal rod shorter than arms 88 extending forward from the rock shaft and rigidly connected at its rear end with the shaft midway the ends of the shaft. A sheet metal bracket 97 secured to the front face of frame wall 2 by screws 98 has an integral arm $97^a$ extending forward over rock shaft 87, and a strong coiled counterbalancing spring 99 is connected at its ends with said bracket arm and the forward end of rock arm 89. Spring 99 is normally stretched by the weight of the shift frame and the parts mounted thereon and of insufficient strength to lift said frame and the platen carriage unaided. The spring extends with its axial line substantially parallel with the plane of shift of the shift frame.

A pair of one-piece sheet steel shift key levers 100 and 101 of identical shape extend rearwardly through two of the guide slots 74 in comb 75 adjacent opposite sides of the machine and then extend upwardly to points substantially at the highest part of the main frame opposite brackets $59^a$ and 59, respectively, where they are formed with pivot holes 102, through which pivot screws 103 extend outward and are screwed into threaded apertures 104 in ears 105 depending from the inner edges of the bracket flanges 58 in vertical planes extending fore-and-aft of the machine. In the rear of their pivots the levers extend downward and rearward to points between the raceway flanges $19^b$ and the upper ends of rock arms 88 and spaced slightly from both the flanges and arms. The rear ends of the levers are slotted upward and forward at 106 to form forks, the fingers of each of which engage respectively over and under the adjacent pin 96, the slots 106 extending substantially perpendicular to the path of shift of the shift frame and the rear arm of each lever exerting an upward thrust on its connected pin substantially in the direction of shift of the shift frame when the key on the lever is depressed. The shift levers 100 and 101 are provided at their forward ends with shift keys 107 and 108, respectively.

It will be obvious that by depressing either key 107 or 108 the shift frame may be moved upward and rearward until arrested by the upper case stops. The shift levers are made of stock sufficiently stiff to move the shift frame upward without springing until the frame is arrested by the stops, but are sufficiently springy to permit their long forward arms to flex or spring downward upon continued pressure on the shift keys. Adjustable depression limiting stops are provided to prevent springing of the levers beyond their limit of elasticity and to prevent the application of sufficient force to the shift frame to bend the case shift stop lugs 36 and 37 or stop carrying plates 38. Each of these stops comprises a strip or bar 109 of sheet steel lying flat against the front face of the vertical web of comb 75 alongside the shift lever guide slot and having an integral lug 110 at its lower end extending rearwardly through said guide slot with its upper edge slightly below the point reached by the lower edge of the key lever at the comb at the time the stops 36 and 40 come into engagement, as indicated in dotted lines in Figs. 1 and 2. Upon depression of the forward springy arm of either shift lever to the level indicated in dotted lines in Fig. 8 further springing of said arm is stopped as the lever arm engages the cooperating stop lug 110 relatively close to the shift key. The stops 109 are vertically adjustable, being provided at their upper ends with vertically elongated apertures or slots 111 for the shanks of clamping screws 112 screwed into threaded apertures in the vertical web of comb 75 to tightly clamp the stop bars to the comb in vertically adjusted position.

In order that the platen carriage may be locked in upper case position, shift locking means are provided for locking down the shift lever 100. A horizontal sheet metal bracket 113 is secured at its forward end by screws 114 to flange 16 on the main frame and is provided with its rear end with an integral inwardly offset lock plate 115 extending upward at the outer side of the plane of shift lever 100 in a transverse plane inclined toward the front of the machine, the lower edge of said plate forming an abutment under which a latch carried by shift lever 100 is adapted to be engaged. A shift lock key 116 is fixed on the upper end of a key stem 117 at the outer side of shift lever 100 in rear of key 107, said stem having a forwardly extending locking lug or latch nose 118 at its lower end and being provided intermediate its ends with a forwardly extending arm 120 pivotally held to lever 100 by a screw 119. Arm 120 is provided with an upstanding stop finger 121 normally engaging the rear edge of key 107 with key stem 117 disposed vertically, the parts being yieldably held in this position by a coiled spring 122 connected with key lever 100 and key stem 117. The parts are so arranged that the latch nose 118 moves downward and rearward in a path behind lock plate 115 when key 107 or key 108 is depressed in ordinary temporary case-shift operations, the nose being disposed above the lower edge of plate 115 when the stops 36 and 40 come into engagement, as shown in dotted lines in Fig. 2. To shift and lock the carriage in upper case position key 116 is depressed sufficiently to lift the carriage to upper case position and then spring the forward arm of lever 100 downward below the positions shown in dotted lines in Fig. 2, the nose 118 sliding down the rear face of the plate 115 until the springing of the lever allows the nose to swing under the lower edge of the plate under the continued pressure on the pivoted key-operated shift latch as shown in full lines in Fig. 8. The nose when thus engaged is pressed tightly up against the lower edge of plate 115 by the reflex action of the sprung lever arm and is held in locking position against the pull of spring 122 by its tight frictional engagement with the plate under pressure of the flexed resilient key lever. The stop 109—110 is so adjusted that the lower edge of lever 100 is spaced slightly above stop lug 110 when the latch is in locking position, as shown in full lines in Fig. 8, so that by pressing down on key 107 to further spring the lever arm down against the stop lug, as shown in dotted lines in Fig. 8, the latch nose 118 may be depressed slightly so that it may be pulled out from under plate 115 by the light spring 122 to release the latch and permit the parts to return to normal position when pressure on key 107 is relieved.

The upper edges of the shift levers are normally spaced below the upper ends of their guide slots and below the cushion 77 to permit variation of the normal position of the shift frame by adjustment of the stop screws 32. The printing key levers are rocked upward against the cushion 77 by return springs 123 connected with depending ears 124 on the key levers adjacent the lower ends of the upturned rear portions of the key levers and extending slightly downward and forward and secured at their forward ends in apertures 125 in a sheet metal anchor bar 126 extending transversely of the machine and supported near its ends in slots 127 extending rearwardly from the forward ends of arms 128 formed integral with brackets 5 and extending downward and forward from the forward edges of the brackets and offset inward from the frame walls 3 by inwardly bending the arms near their rear ends. A pair of brackets 129 extending forward from the carriage bed, to which they are secured near opposite ends of the bed, each supports one of the ribbon spools 130 of the machine forward of the platen and below the level of the top of platen. The rear arms of the shift levers 100 and 101 pass through and swing up and down in slots 131 in the inclined frame wall 4.

What we claim is:

1. In a typewriting machine, the combination of a main frame; a platen carriage; a platen on the carriage; a bed upon which the carriage is mounted to travel transversely of the main frame; key-actuated multiple-case printing instrumentalities on the main frame; a pair of resilient sheet metal members inside the main frame extending fore and aft of the machine and each rigidly secured adjacent one edge only thereof to the main frame to permit flexing of the free portion thereof transversely of the machine, said pair of resilient members being formed with raceways parallel with their rigidly secured edges facing inward toward opposite sides of the machine; a pair of rigid members rigidly held to the bed extending between the resilient members and formed with raceways facing outward toward opposite sides of the machine opposite the raceways on the resilient members; antifriction rolling elements in the races formed by the opposed raceways on each two adjacent resilient and rigid members; adjustable means on the main frame for flexing the free portions of said resilient members transversely of the machine and positively holding them in flexed position; and key-operated means for shifting the bed and the parts movable therewith to change case.

2. In a typewriting machine, the combination of a main frame; a platen; multiple-case printing instrumentalities cooperative with the platen; a support shiftable to vary the relation between the platen and printing instrumentalities to change case; a pair of rigid guide members spaced apart transversely of the machine rigidly held to the support to shift therewith and each formed with a raceway facing outwardly toward the adjacent side of the machine; a pair of resilient sheet metal guide members extending fore and aft of the machine and each rigidly held to the main frame adjacent one edge only and having its free portion located outside of the adjacent rigid guide member, the free portion of each resilient guide member being spaced inward from the main frame so as to permit flexing thereof both inwardly and outwardly and being formed with an inwardly facing raceway opposite the raceway on the adjacent rigid guide member; a plurality of rolling elements in each race formed by the opposed raceways on adjacent rigid and resilient guide members; rigid abutment devices spaced transversely of the machine and mounted on the main frame for adjustment transversely of the machine, said transversely spaced abutment devices being cooperative with the outer faces of the free portions of the resilient guide members to flex the same laterally and hold them rigidly in flexed position; and key-operated means for shifting said support and the attached rigid guide members.

3. In a typewriting machine, the combination of a main frame; a platen; multiple-case printing instrumentalities cooperative with the platen; a support shiftable to vary the relation between the platen and printing instrumentalities to change case; a pair of rigid guide members spaced apart transversely of the machine rigidly held to the support to shift therewith and each formed with a raceway facing outwardly toward the adjacent side of the machine; a pair of resilient sheet metal guide members extending fore and aft of the machine and each rigidly held to the main frame adjacent one edge only and having its free portion located outside of the adjacent rigid guide member, the free portion of each resilient guide member being spaced inward from the main frame so as to permit flexing thereof both inwardly and outwardly and being formed with an inwardly facing raceway opposite the raceway on the adjacent rigid guide member; a plurality of rolling elements in each race formed by the opposed raceways on adjacent rigid and resilient guide members; two sets of rigid abutment devices spaced transversely of the machine and all mounted on the main frame for adjustment independently of each other transversely of the machine, each set of said devices engaging the outer face of the free portion of the adjacent resilient guide member at points spaced longitudinally of the raceway thereon to flex said member and hold it in flexed position; and key-operated means for shifting the support.

4. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, and key-operated means for shifting the support in an up and down direction.

5. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, a rigid tie means connecting the lower ends of the rigid guide members and resisting both inward and outward movements thereof, and key-operated means for shifting the support in an up and down direction.

6. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, longitudinally adjustable means extending transversely of the machine between the rigid guide members and secured thereto adjacent their lower ends for rigidly holding said members in parallelism, and key-operated means for shifting the support.

7. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, a shift key, and means operated by said key having a pin and slot connection with each of the rigid guide members for forcing both members upwardly when said key is depressed.

8. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, a rock shaft journalled on the main frame, a pair of rock arms fixed on said shaft and pivotally connected with said rigid guide members, and key operated means for rocking said shaft.

9. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, a rock shaft extending transversely of the main frame and journalled thereon, a pair of rock arms fixed on said shaft and pivotally connected with said rigid guide members, and a key lever fulcrumed intermediate its ends on the main frame and pivotally connected at its rear end with one of said rock arms.

10. In a typewriting machine, the combination of a main frame, a pair of flexible guide members spaced apart transversely of the frame and formed with inwardly facing raceways extending in an up and down direction, means rigidly securing the flexible members to the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, a rock shaft extending transversely of the machine and journalled on the main frame, a pair of rock arms fixed on said shaft, a pair of pivot pins connecting said arms with the rigid guide members, a counterbalancing spring connected with the shaft and main frame normally tending to rock the arms upwardly, and a pair of shift key levers fulcrumed on the main frame adjacent opposite sides of the machine intermediate their ends and each pivotally connected with a different one of said pivot pins.

11. In a typewriting machine, the combination of a main frame, a pair of flexible guide members spaced apart transversely of the frame and formed with inwardly facing raceways extending in an up and down direction, means rigidly securing the flexible members on the main frame at one side only of the raceways, a carriage support, a platen carriage mounted on the support, a platen on the carriage, printing instrumentalities on the main frame, a pair of rigid guide members depending from the carriage support and rigidly held thereto at their upper ends, said rigid guide members being located adjacent different flexible guide members and formed with outwardly facing raceways opposite the raceways on the flexible members, a plurality of antifriction rolling elements interposed between each rigid member and the adjacent flexible member and traveling in the raceways thereon, adjusting screws extending transversely of the main frame and supported thereon and abutting at their inner ends against the outer faces of the free raceway carrying portions of the flexible members, a rock shaft extending transversely of the machine and journalled on the main frame, a pair of rock arms fixed on said shaft, a pair of pivot pins connecting said arms with the rigid guide members, a counterbalancing spring connected with the shaft and main frame normally tending to rock the arms upwardly, and a pair of shift key levers fulcrumed on the main frame adjacent opposite sides of the machine intermediate their ends and each pivotally connected with a different one of said pivot pins, said pivot pins being secured to the rock arms, and said rigid guide members and key levers being provided with slots extending transversely of the path of movement of the guide members in which said pins engage.

12. In a typewriting machine, a support shiftable upwardly to change case, stationary guides for the support, a shift torsion frame comprising a rock shaft extending transversely of the machine and a pair of rock arms fixed on said shaft adjacent opposite sides of the machine, a pair of transversely extending pins carried by said rock arms, said support having slots extending transversely of its path of movement in which said pins engage, a counterbalance spring connected with said torsion frame to normally urge the rock arms upwardly, and a shift key lever fulcrumed intermediate its ends and having a rearwardly facing fork at its rear end embracing one of said pins.

13. In a typewriting machine, the combination of a carriage bed, a pair of depending raceway members held to the bed, a pair of stationary companion raceway members, antifriction elements between each stationary member and the adjacent raceway member on the bed, a counterbalancing and torsion frame pivotally supported to swing up and down, a spring normally tending to lift the frame, transversely extending pivot means on said frame, said depending members having slots extending transversely thereof through which said pivot means extends, and a shift key lever fulcrumed intermediate its ends and engaged with said pivot means back of its fulcrum for shifting the carriage bed.

14. In a typewriting machine, the combination of a main frame; a case-shift frame; a pair of rigid raceway-containing elements spaced transversely of the machine; a pair of resilient supports interposed between said elements and one of said frames and each rigidly held both to said frame and the element supported thereby, the other frame having a pair of unyielding raceways opposed to the raceways on said elements, all of said raceways lying in one plane; rolling elements in the races formed by the pairs of oppositely disposed raceways, said resilient supports being temporarily twistable and flexible transversely of the machine; and independent adjusting means on the frame to which the supports are held cooperative directly with the rigid raceway-containing elements to vary the spacing between said elements and also cooperative therewith to cant said elements relatively to said frame while resiliently held thereto, said adjusting means being arranged to rigidly hold the rigid raceway-containing elements in adjusted position.

15. In a typewriting machine, the combination of a main frame, a key lever guide comb secured to the main frame, a shift key lever fulcrumed on the main frame back of said comb, and a stop held to said comb for limiting the depression of the forward arm of said lever, said stop comprising a vertical sheet metal strip lying flat against one face of the comb at one side of the shift key lever guide slot, and secured to the comb at its upper end, said strip having a lug adjacent its lower end bent into a plane extending fore-and-aft of the machine and extending through the shift key lever guide slots below the key lever.

16. In a typewriting machine, the combination of a main frame, a platen, printing instrumentalities, a part shiftable to vary the relation between the platen and printing instrumentalities to change case, a one-piece sheet metal shift key lever positively connected with said part to shift the same and pivotally mounted on the main frame forward of said connection, stop means for positively arresting said part in upper case position, a manually operable latch shiftably mounted on said key lever adjacent the shift key thereon, a fixed latch abutment on the main frame under which the latch is shiftable upon a slight downward springing of the forward arm of the key lever after arrest of said shiftable part by said stop means, and a fixed stop adapted to positively limit downward springing of the said lever arm, said stop arranged under the key lever adjacent its key-carrying end and so disposed as to permit sufficient springing of the lever to allow engagement of the latch under said abutment with the lever slightly flexed edgewise under tension but to prevent sufficient springing of the lever to permanently distort the same.

17. In a typewriting machine, the combination of a main frame, a platen, printing instrumentalities, a part shiftable to vary the relation between the platen and printing instrumentalities to change case, a one-piece sheet metal shift key lever positively connected with said part to shift the same and pivotally mounted on the main frame forward of said connection, stop means for positively arresting said part in upper case position, a manually operable latch shiftably mounted on said key lever adjacent the shift key thereon, a fixed latch abutment on the main frame under which the latch is shiftable upon a slight downward springing of the forward arm of the key lever after arrest of said shiftable part by said stop means, a fixed stop adapted to positively limit downward springing of the said lever arm, said stop arranged to permit downward springing of the forward arm of the lever slightly beyond a point necessary to permit movement of the latch under said abutment but above a point at which said lever would be bent beyond its limit of elasticity, and a spring normally urging said latch out of cooperative relation with said abutment.

18. In a typewriting machine, the combination of a main frame, a platen, printing instrumentalities, a part shiftable to vary the relation between the platen and printing instrumentalities to change case, a one-piece sheet metal shift key lever positively connected with said part to shift the same and pivotally mounted on the main frame forward of said connection, stop means for positively arresting said part in upper case position, a manually operable latch shiftably mounted on said key lever adjacent the shift key thereon, a fixed latch abutment on the main frame under which the latch is shiftable upon a slight downward springing of the forward arm of the key lever after arrest of said shiftable part of said stop means, a fixed stop adapted to positively limit downward springing of the said lever arm, said stop arranged to permit downward springing of the forward arm of the lever slightly beyond a point necessary to permit movement of the latch under said abutment but above a point at which said lever would be bent beyond its limit of elasticity, a spring normally urging said latch out of cooperative relation with said abutment, and a key-lever guide comb held to the main frame in rear of said latch and having a guide slot for said shift key lever, said stop comprising a sheet metal body secured to one face of the guide comb and having an integral lug thereon extending through the shift key lever guide slot below said key lever.

19. A raceway member for guiding a shiftable case-changing support for typewriting machines formed of a single flat piece of resilient sheet metal and stamped and pressed to provide a rigid channel portion extending longitudinally of said member and a flat attachment portion united with the channel portion by spaced arms extending transversely of the channel portion and attachment portion and flexibly supporting the channel portion wholly to one side of the plane of the attachment portion for lateral movement either toward or from a member to which said attachment member is secured.

20. A raceway member for guiding a shiftable case-changing support for typewriting machines formed of a single flat piece of resilient sheet metal and stamped and pressed to provide a rigid channel portion extending longitudinally of said member and a flat attachment portion united with the channel portion by spaced arms extending transversely of the channel portion and attachment portion, said attachment portion having apertures therein for fastening devices and said arms being laterally flexible and twistable.

21. A supporting and guiding member for a shiftable platen carriage bed comprising a single piece of flat sheet metal stamped to form a flat body portion having a top attachment flange and a side raceway flange disposed with one end of the top flange engaging one face of the raceway flange, said body portion having a tongue-like part thereof stamped up into the plane of the top flange and extending in the opposite direction to thus provide support engaging surfaces at both sides of the plane of the body portion.

22. A supporting and guiding member for a shiftable platen carriage bed comprising a single piece of flat sheet metal stamped to form a flat body portion having a top attachment flange and a side raceway flange disposed with one end of the top flange engaging one face of the raceway flange, said body portion having a tongue-like part thereof stamped up into the plane of the top flange and extending in the opposite direction to thus provide support engaging surfaces at both sides of the plane of the body portion, said top flange having screw apertures therein and said tongue-like part forming an abutment for engaging a companion stop to limit movement of the guiding member in one direction when assembled in a machine.

23. A supporting and guiding member for a shiftable platen carriage bed comprising a single piece of flat sheet metal stamped to form a flat body portion having a top attachment flange and a side raceway flange disposed with one end of the top flange engaging one face of the raceway flange, said body portion having a tongue-like part thereof stamped up into the plane of the top flange and extending in the opposite direction to thus provide support engaging surfaces at both sides of the plane of the body portion, said top flange and tongue-like part having screw apertures therein for fastening the same to a carriage bed, said tongue-like part forming a stop for limiting shift movements of the guide member in one direction and said body part having a second tongue like part stamped therefrom parallel with said first-mentioned tongue part and at a lower level and forming a support for an adjustable stop for limiting movement of the guide member in the opposite direction.

24. A supporting and guiding member for a shiftable platen carriage bed comprising a single piece of flat sheet metal stamped to form a flat body portion having a top attachment flange and a side raceway flange disposed with one end of the top flange engaging one face of the raceway flange, said body portion having a tongue-like part thereof stamped up into the plane of the top flange and extending in the opposite direction to thus provide support engaging surfaces at both sides of the plane of the body portion, said top flange and tongue-like part having screw apertures therein for fastening the same to a carriage bed, said tongue-like part forming a stop for limiting shift movements of the guide member in one direction and said body part having a second tongue like part stamped therefrom parallel with said first-mentioned tongue part and at a lower level and forming a support for an adjustable stop for limiting movement of the guide member in the opposite direction, said raceway flange having aligned longitudinal slots therein formed with oppositely beveled longitudinal side edges for guiding ball bearings.

25. A case changing support for a platen carriage comprising a carriage bed plate, a pair of sheet metal brackets having flat body portions depending from the bed plate near its ends in a plane extending longitudinally of the plate and each having a raceway flange along its outer edge and an attachment flange abutting the under face of the bed, the outer end of each attachment flange being brazed to the inner face of the adjacent raceway flange, screws securing each attachment flange to the bed plate, the body portion of each bracket being formed with a lug near its lower end in a plane perpendicular to the body portion, a rigid tie member extending between said ears provided with internal screw threads at its ends, screws passing inwardly through said lugs and screwed into the internally threaded ends of said tie member with their heads abutting the outer faces of the lugs, said tie member being externally threaded at one end, and an internally threaded adjusted member screwed on the externally threaded end of the tie member and engaging the inner face of the adjacent lug to hold the other end of the tie member in engagement with the inner face of the lug adjacent thereto.

26. A case-shift frame for typewriting machines comprising a carriage support, a pair of sheet metal brackets depending from said support near its ends each having an attachment flange at the top thereof and a raceway flange at one side edge rigidly secured at its upper end to the attachment flange, means detachably securing the attachment flanges of the brackets to the carriage support, and means detachably connecting the brackets near their lower ends and holding the brackets against movement toward or from each other, said last mentioned means being adjustable to lengthen and shorten the same.

27. A case-shift frame for typewriting machines comprising a carriage support, a pair of sheet metal brackets depending from said support near its ends each having an attachment flange at the top thereof and a raceway flange at one side edge rigidly secured at its upper end to the attachment flange, means detachably securing the attachment flanges of the brackets to the carriage support, means detachably connecting the brackets near their lower ends and holding the brackets against movement toward or from each other, said last mentioned means being adjustable to lengthen and shorten the same, an upper case stop carried by each bracket, and a lower case stop carried by each bracket.

28. Guiding and stopping means for a shiftable case changing support for a typewriting machine having a main frame, comprising a pair of sheet metal brackets supported in an upright position on the main frame of the machine adjacent opposite sides thereof and each provided with a pair of inwardly extending arms integral therewith, an upper case stop carried by one arm of each bracket, a lower case stop carried by the other arm of each bracket, a pair of sheet metal raceway members arranged at the inner faces of said brackets, and fastening screws extending through each bracket and the adjacent raceway member and securing both detachably to the main frame of the machine.

29. In a typewriting machine, the combination of a main frame having vertical side walls, a pair of sheet metal brackets having flat body portions abutting the inner faces of the side walls of the main frame and provided with inwardly extending arms, case shift stops carried by the bracket arms, a pair of resilient upstanding sheet metal raceway members at opposite sides of the frame each having an attachment portion abutting the inner face of the adjacent bracket and a raceway portion at one side of the attachment portion, the raceways on the raceway portion extending in an up and down direction, screws holding the brackets and attachment portions of the raceway members detachably to the side walls of the main frame, adjusting screws threaded through the brackets and engaging the outer faces of the raceway portions of said members, a case-changing support having raceways cooperating with the raceways on said resilient members and stops cooperating with the stops on said brackets, rolling elements traveling in the raceways, and key-operated means for shifting the support.

30. In a three-quarter strike typewriting machine, the combination of a main frame, a platen carriage adjacent the rear of the main frame, a platen on the carriage, a shiftable support for the carriage, means guiding the support to shift in an upwardly and rearwardly inclined plane, an arcuate system of type bars pivotally supported on the main frame with their pivots in an arc in a plane parallel with the plane in which said support is shiftable and each having two types in a single plane, key-operated means for actuating the type bars to printing positions in which the types thereon are in a plane parallel with the plane of shift of the support, a sheet metal shift key lever arched upwardly intermediate its ends, means pivotally supporting said lever at the top of its arch on the main frame at one side of the system of type bars to swing up and down, means pivotally connecting the support with the rear end of the lever to move up and down therewith, means for positively arresting upward movement of the support with the printing point on the platen in position for receiving impact of the upper case type, the forward arm of said lever being inherently resilient and relatively long and sufficiently stiff to shift said support without springing until said arresting means comes into action, and means adapted to be engaged by said forward lever arm near its key-carrying end after a slight springing of said arm, and cooperating locking means on the lever and frame adapted to be engaged and disengaged when the lever arm is sprung downwardly.

31. In a three-quarter strike typewriting machine, the combination of a main frame, a platen carriage adjacent the rear of the main frame, a platen on the carriage, a shiftable support for the carriage, means guiding the support to shift in an upwardly and rearwardly inclined plane, an arcuate system of type bars pivotally supported on the main frame with their pivots in an arc in a plane parallel with the plane in which said support is shiftable and each having two types in a single plane, key-operated means for actuating the type bars to printing positions in which the types thereon are in a plane parallel with the plane of shift of the support, a sheet metal shift key lever arched upwardly intermediate its ends, means pivotally supporting said lever at the top of its arch on the main frame at one side of the system of type bars to swing up and down, a rock shaft journalled in the rear lower part of said main frame, a pair of forwardly extending rock arms fixed on said shaft, a pair of transversely extending pins carried by said arms, said support having slots perpendicular to the plane of movement thereof in which said pins engage and the rear end of said lever having a slot extending transversely of the plane of movement of the support through which one of said pins extends, means for arresting upward and downward movements of the support with the platen in position to receive impacts of the upper and lower case types at a printing point on the upper front quarter of the platen, and counterbalancing spring means normally tending to rock the shaft in a direction to lift the platen carriage support.

32. In a portable typewriting machine, the combination of a main frame having a low rear portion, a platen carriage traveling over the rear portion of said frame, a platen on the carriage, a support for the carriage located at the rear of the machine below the level of the highest part of the main frame, means for guiding the support to shift upwardly and rearwardly in an inclined plane, a pair of shift key levers at opposite sides of the main frame arched upwardly intermediate their ends and pivotally supported at the tops of their arches on the main frame adjacent the top of the main frame forward of the low rear part of the frame, means forming pin and slot connections between the rear ends of said levers and said support with the slots of said connections extending transversely of the path of movement of the support, a system of type bars between said shift key levers pivotally supported on the main frame forward of said support with their pivots in an arc in a plane parallel with the plane of movement of the support and each carrying two types in a single plane, key-operated means for swinging said type bars from normal forwardly and upwardly extending positions to printing positions in which the types thereon are in a plane parallel with the plane of shift of the support, and means for arresting the support in upper and lower case positions in which the upper and lower case types on a bar will strike a single printing point at the upper front quarter of the platen.

33. In a typewriting machine, the combination of a main frame having vertical side walls, a carriage bed extending across the rear portion of the frame in a downwardly and rearwardly inclined plane, a pair of sheet metal brackets having flat body portions abutting the inner faces of said side walls adjacent the rear end of the frame and each provided with an arm extending inwardly and lying flatwise in a plane parallel with the carriage bed and closely adjacent thereto and a second arm extending inwardly and provided with a rearwardly extending upper case stop lug lying flatwise in a plane parallel with the bed and well below the same, adjustable lower case stop screws threaded upwardly through the first mentioned bracket arms, a pair of adjustable sheet metal guide members at opposite sides of the frame each having a channel portion perpendicular to the bed and a flat attachment portion abutting the inner face of the adjacent bracket connected with the channel portion by resilient superposed and spaced arms, fastening screws common to each bracket and the attachment portion of the adjacent guide member detachably holding the same rigidly to the main frame, a plurality of adjusting screws threaded inwardly through each bracket and engaging the channel portion of the adjacent guide member at points spaced longitudinally of the channel portion, the second mentioned arm on each bracket extending between the arms of the adjacent guide members on the main frame, a pair of sheet metal guide members depending from the bed adjacent opposite sides of the machine each having a body portion disposed transversely of the machine in a plane perpendicular to the bed and provided along its outer edge with a raceway flange projecting forwardly and upwardly therefrom between the channel portion of the adjacent adjustable guide member and the upper case stop lug on the adjacent bracket, said depending guide members being rigidly secured at their upper ends to the bed and each having a lower case stop lug extending rearwardly from the upper part of its body portion flatwise in a plane parallel with the bed and normally seated on one of the adjustable lower case stop screws, said body portion of each depending member also having a forwardly extending lug lying flatwise parallel with the bed, upwardly and rearwardly extending adjustable upper case stop screws supported by the last-mentioned lugs in position to engage under the upper case stop lugs on the brackets, when the depending guide members are moved upwardly, key-operated means connected with the depending guide members for shifting the same upwardly, a rearwardly tilted platen carriage mounted on the bed, a platen on the carriage, and key actuated type bars pivotally mounted on the frame with the pivots in an arc lying in a plane perpendicular to the plane of the bed and forward thereof.

34. In a typewriting machine, the combination of a shiftable case changing support having ball races extending in an up and down direction facing toward opposite sides of the machine, resilient laterally flexible and twistable arms extending fore-and-aft of the machine, means rigidly holding said arms at one end adjacent opposite sides of the machine, rigid elements carried by the free ends of the arms and having races cooperating with the races on the support to form ways for antifriction elements, antifriction elements in said ways, a plurality of independently adjustable devices engaged with each of said rigid elements at points spaced longitudinally of the ways and movable to different adjusted positions transversely of the machine, and key-operated means for shifting the support.

35. In a three-quarter strike portable typewriting machine, the combination of a low main frame, a shift frame disposed below the level of the highest part of the main frame, means guiding said shift frame to move up and down in a plane extending transversely of the machine and inclined toward the rear of the main frame, a transverse rock shaft journalled on the main frame in the rear of the shift frame and close to the base of the main frame, a pair of rock arms fixed on said shaft extending forwardly and upwardly to the shift frame, a pair of transversely extending pins carried by the forward ends of said rock arms, said shift frame having slots extending transversely of its path of movement in which said pins are engaged, a shift key lever fulcrumed on the main frame intermediate its ends at a point above and forward of one of said pins and having an arm extending downwardly and rearwardly to said pin and provided with a slot extending transversely of the path of movement of the shift frame through which said pin extends, a counterbalancing spring normally tending to rock said shaft and arms in a direction to lift the shift frame, a platen carriage mounted on top of the shift frame to travel transversely of the main frame across the rear portion of the main frame, a platen on the carriage, key actuated type bars pivotally supported on the main frame with their pivots in an arc in a plane forward of and parallel with the path of movement of the shift frame and each carrying two types in a single plane different distances from its pivot, and means for limiting shifting of the shift frame between points at which the upper and lower case types may print at a point at the upper front quarter of the platen, the weight of the shift frame and parts thereon normally overcoming the force of the counterbalancing spring.

36. In a three-quarter strike typewriting machine, the combination of a main frame, a shift frame for changing case, means guiding said shift frame to move in an inclined plane extending transversely of the machine, a transverse rock shaft journalled on the main frame in the rear of the shift frame, forwardly and upwardly extending rock arms fixed on said shaft, a key lever fulcrumed intermediate its ends on the main frame and having a downwardly and rearwardly extending arm at the rear of its fulcrum, said rock arms and said key lever arm being connected with the shift frame to exert a lifting thrust thereon substantially in the plane of shift of the shift frame, a third rock arm on the shaft, and a coiled spring connected at its opposite ends to said third rock arm and the main frame and normally held stretched by the weight of the shift frame and parts shifted thereby and arranged with its axial line substantially parallel with the plane of shift of the shift frame.

37. In a typewriting machine, the combination of means shiftable to effect changes of case in typing and provided with raceways facing toward opposite sides of the machine, a pair of guides each comprising a rigid raceway portion and a resilient supporting means for said portion temporarily flexible and twistable transversely of the machine, means for holding said guides against shifting movement longitudinally of the raceways thereon with the raceways on the two guides facing the raceways on the shiftable means, rolling elements interposed between the guides and said shiftable means and traveling in the races thereon, adjustable means cooperative with the rigid raceway portions of said guides to shift and hold the same while supported by said flexible and twistable means to regulate the spacing therebetween and to afford adjustments of said raceway portions transversely of the machine at either or both ends of said raceway portions to regulate the path of travel of the shiftable means, and means for imparting case-changing movements to said shiftable means.

38. In a typewriting machine, the combination of means shiftable to effect changes of case in typing and provided with raceways facing toward opposite sides of the machine. a pair of guides each comprising a rigid raceway portion and a resilient supporting means for said portion temporarily flexible and twistable transversely of the machine, means for holding said guides against shifting movement longitudinally of the raceways thereon with the raceways on the two guides facing the raceways on the shiftable means, rolling elements interposed between the guides and said shiftable means and traveling in the races thereon, a pair of adjusting devices for each guide cooperative with the rigid raceway portion thereof at two longitudinally spaced points on said portion to hold the same in desired adjusted position and shiftable independently of each other transversely of the machine to adjust said rigid portion while the same is supported by said flexible and twistable resilient supporting means.

39. In a typewriting machine, the combination of a main frame, means shiftable to effect changes of case in typing and provided with raceways facing toward opposite sides of the machine, a pair of guides rigidly held in the main frame adjacent opposite sides of the machine and provided with rigid raceway portions resiliently supported in such manner as to permit movement thereof transversely of the machine, the raceways in said raceway portions of the guides facing the raceways on the shiftable means, rolling elements between the guides and shiftable means and traveling in the raceways thereon, means for imparting case-changing movements to the shiftable means, and means on the main frame engaged with the rigid raceway portions of the guides and adjustable independently transversely of the machine to maintain said rigid raceway portions in desired transversely adjusted relation to each other and the main frame.

40. In a typewriting machine, a main frame, a pair of brackets arranged in the main frame adjacent opposite sides of the frame, upper and lower case stops on each of said brackets, a pair of guide members provided with raceways and each arranged in the main frame adjacent a different one of said brackets, means shiftable to effect changes of case in typing and provided with raceways cooperating with the raceways on the guide members, rolling elements interposed between the shiftable means and the guide members and traveling in the raceways thereon, a pair of upper case stops on the shiftable means cooperating with the upper case stops on the brackets, a pair of lower case stops on the shiftable means cooperating with the lower case stops on the brackets, fastening devices for the brackets and guide members each extending through one bracket and the adjacent guide member and holding both detachably to the main frame, and means for imparting case-changing movements to the shiftable means.

41. In a typewriting machine, a main frame having front, rear and side walls and a transverse partition wall, said partition wall being inclined upwardly and rearwardly and located adjacent the rear wall, a type bar segment held to the front face of said partition wall, a pair of sheet metal brackets at opposite sides of the frame each having a flat body portion abutting the inner face of the adjacent side wall of the frame between the rear and partition walls, screws detachably holding the body portions of said brackets to the frame side walls, the body portion of each bracket being provided with an integral flat arm extending inward between the rear and partition walls in a plane parallel with the plane of the inclined partition wall and formed with a flat lug lying in a plane perpendicular to the plane of said partition wall forming an upper case stop, shiftable platen supporting means a part of which extends into the space between the back and partition walls, means between the back and partition walls for guiding said platen supporting means to shift in a plane parallel with the plane of the partition wall, means for shifting said platen supporting means, a pair of endwise adjustable upper case stop screws carried by said supporting means perpendicular to the plane of said lugs for engagement of the upper ends thereof with the under faces of the lugs, type bars each carrying upper and lower case types and pivoted in said segment, means for actuating the type bars, a platen shiftable by said supporting means between case positions for receiving on its upper front quarter impacts of types on said type bars, and cooperating lower case stops carried by said brackets and platen supporting means.

42. A typewriting machine as claimed in claim 41, wherein the lower case stops carried by the platen supporting means comprise a pair of flat sheet metal lugs lying in a plane perpendicular to the plane of the partition wall, and the lower case stops carried by the brackets comprise a pair of endwise adjustable screws arranged for engagement of their upper ends with the lower faces of the lugs on the shiftable support and threaded through flat arms bent inward from the body portions of the brackets.

43. A typing machine as claimed in claim 41, in which the guiding means for the shiftable platen support comprises a pair of guide members held to the main frame by certain of said fastening screws for the brackets.

44. In a typewriting machine, a main frame having front, rear and side walls and a transverse partition wall, said partition wall being inclined upwardly and rearwardly and located adjacent the rear wall, a platen, shiftable supporting means for the platen having a guiding portion extending into the space between the rear and partition walls, means held to the main frame and located between the rear and partition walls for guiding said guiding portion of the platen supporting means to move in a plane parallel with the plane of the partition wall, a type bar segment held to the front face of the partition wall in a plane parallel with said wall, type bars having upper and lower case type and pivoted in said segment to strike on the upper front quarter of the platen, a rock shaft journalled on the side walls of the main frame between the rear and partition walls, a pair of rock arms extending upwardly and forwardly from said shaft back of the partition wall, a pair of transverse pins connecting said rock arms and the shiftable support, and a pair of shift key levers pivotally supported in the frame intermediate their ends adjacent opposite sides of the frame and connected at their rear ends with said pins, said partition wall having slots therein through which the rear arms of said key levers extend, and the rear arms of said levers extending rearwardly and downwardly from the lever pivots to said pins.

45. In a typewriting machine, a main frame, a pair of brackets adjacent opposite sides of the machine, upper and lower case stop devices carried by each bracket, a pair of guide members each having a rigid raceway portion resiliently supported thereon to yield transversely of the machine, means detachably holding the guide members and brackets to the main frame with the raceways in the guide members facing opposite sides of the machine, a support shiftable to change case and provided with raceways facing opposite sides of the machine and cooperating with the raceway portions of the guide members to form ball races, balls in the ball races, and means carried by the brackets cooperative with the rigid raceway portions of the guide members for effecting adjustments thereof, the adjusting means on each bracket being arranged to shift the rigid raceway portion of the adjacent guide member transversely of the main frame in one direction and hold the same in shifted position against return movement.

46. A typewriting machine as claimed in claim 45, wherein the adjusting means on each bracket comprises a plurality of screws threaded through the bracket for engagement with the rigid raceway portion of the adjacent guide member at points spaced apart longitudinally of the ball race.

47. A typewriting machine as claimed in claim 45, wherein the raceway portions of the guide members are located between the side walls of the main frame and the raceway portions of the support, and the adjusting means on each bracket comprises a plurality of screws threaded through the bracket for engagement of the inner ends of said screws with the outer face of the rigid raceway portion of the adjacent guide member at points spaced apart longitudinally of the ball race, the outer ends of the screws being accessible from the exterior of the main frame side walls.

48. A typewriting machine as claimed in claim 45, in which the ball races extend upwardly and rearwardly, a downwardly and rearwardly tilted platen carriage being mounted to travel on the upper part of the support, and an arcuate system of type bars being provided with their pivots located below and in front of the carriage in a plane parallel with the plane of movement of the shiftable support.

In testimony whereof we hereunto affix our signatures this 6th day of May 1925.

ALONZO B. ELY.
EDWIN L. HARMON.